(12) United States Patent
Hosein

(10) Patent No.: US 7,026,921 B1
(45) Date of Patent: Apr. 11, 2006

(54) ENGINE TEMPERATURE MONITORING DEVICE

(76) Inventor: Rasheed Hosein, 120-31 131th St., South Ozone Park, NY (US) 11420

( * ) Notice: Subject to any disclaimer, the term of this patent is extended or adjusted under 35 U.S.C. 154(b) by 139 days.

(21) Appl. No.: 10/681,293

(22) Filed: Oct. 9, 2003

(51) Int. Cl.
*B60Q 1/00* (2006.01)

(52) U.S. Cl. .................. 340/441; 340/449; 340/581; 340/584; 340/588; 340/589

(58) Field of Classification Search ............. 340/441, 340/411, 449, 450, 650, 685, 485, 500, 507, 340/581, 584, 588, 589, 870.17; 374/124, 374/144, 130, 163; 73/346, 343 R; 123/41.15, 123/335, 417
See application file for complete search history.

(56) References Cited

U.S. PATENT DOCUMENTS

| 3,044,096 | A | | 8/1962 | Boddy |
| 4,074,672 | A | * | 2/1978 | LaDue et al. ......... 123/198 DC |
| 4,282,754 | A | * | 8/1981 | Provasnik .................. 374/144 |
| 4,548,780 | A | | 10/1985 | Krohn |
| 5,024,534 | A | * | 6/1991 | Matsubara et al. ......... 374/144 |
| 5,106,202 | A | | 4/1992 | Anderson et al. |
| D343,130 | S | | 1/1994 | Gambill et al. |
| 5,669,714 | A | | 9/1997 | Runne |
| 5,708,412 | A | * | 1/1998 | Proulx ....................... 340/449 |

* cited by examiner

*Primary Examiner*—Hung Nguyen

(57) ABSTRACT

An engine temperature monitoring device for alerting a vehicle operator that an engine is overheated includes a heat sensor adapted for detecting ambient temperature levels. A processor adapted for monitoring the temperature levels is operational coupled to the heat sensor. A speaker for producing an audible sound is operationally coupled to the processor. The speaker is turned on when the heat sensor detects a temperature of the engine which is greater than an acceptable tolerance. A power supply is operationally coupled to the processor. The heat sensor is secured to the engine such that the heat sensor may detect the temperature of the engine.

5 Claims, 3 Drawing Sheets

ENGINE TEMPERATURE MONITORING DEVICE

BACKGROUND OF THE INVENTION

1. Field of the Invention

The present invention relates to engine thermostat devices and more particularly pertains to a new engine thermostat device for monitoring the temperature of the engine itself and to signal an operator of the engine that the temperature is above acceptable tolerances for the proper functioning of the engine.

2. Description of the Prior Art

The use of engine thermostat devices is known in the prior art. These are generally predicated on taking the temperature of the coolant moving through the cooling system of the engine. However, if the cooling system fails by either a pump shutdown, air pockets in the coolant, or a coolant leak, the temperature gauge for the engine will not read a correct temperature. For that reason, a device is needed that monitors the temperature of the engine directly and in way that can be retrofitted to existing engines.

SUMMARY OF THE INVENTION

The present invention meets the needs presented above by utilizing a heat sensor that is attached to the engine and sends a signal to an alarm when the temperature of the engine exceeds acceptable tolerances of safe operating temperatures.

Another object of the present invention is to provide a new engine thermostat device which includes an alarm that is selectively mountable within an interior of a vehicle.

Still another object of the present invention is to provide a new engine thermostat device that is retrofittable to existing engines.

To this end, the present invention generally comprises a heat sensor adapted for detecting ambient temperature levels. A processor adapted for monitoring the temperature levels is operational coupled to the heat sensor. A speaker for producing an audible sound is operationally coupled to the processor. The speaker is turned on when the heat sensor detects a temperature of the engine which is greater than an acceptable tolerance. A power supply is operationally coupled to the processor. The heat sensor is secured to the engine such that the heat sensor may detect the temperature of the engine.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
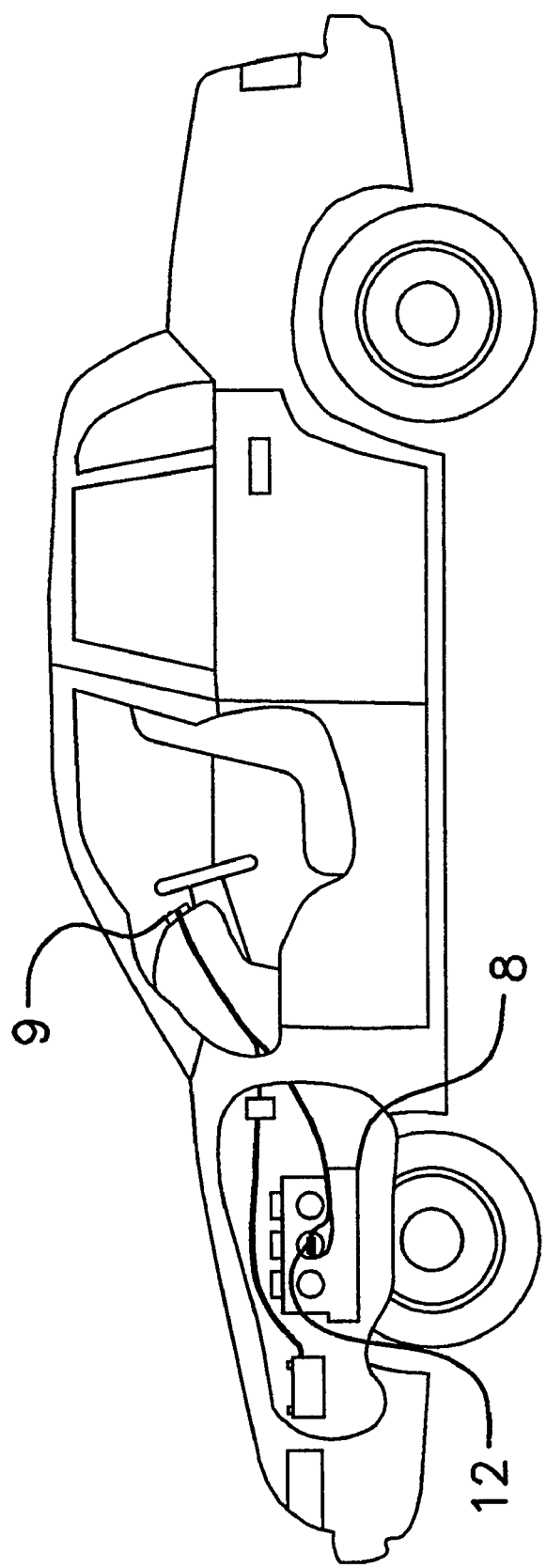
FIG. 1 is a schematic side view of a engine temperature monitoring device according to the present invention.
Figure 2:
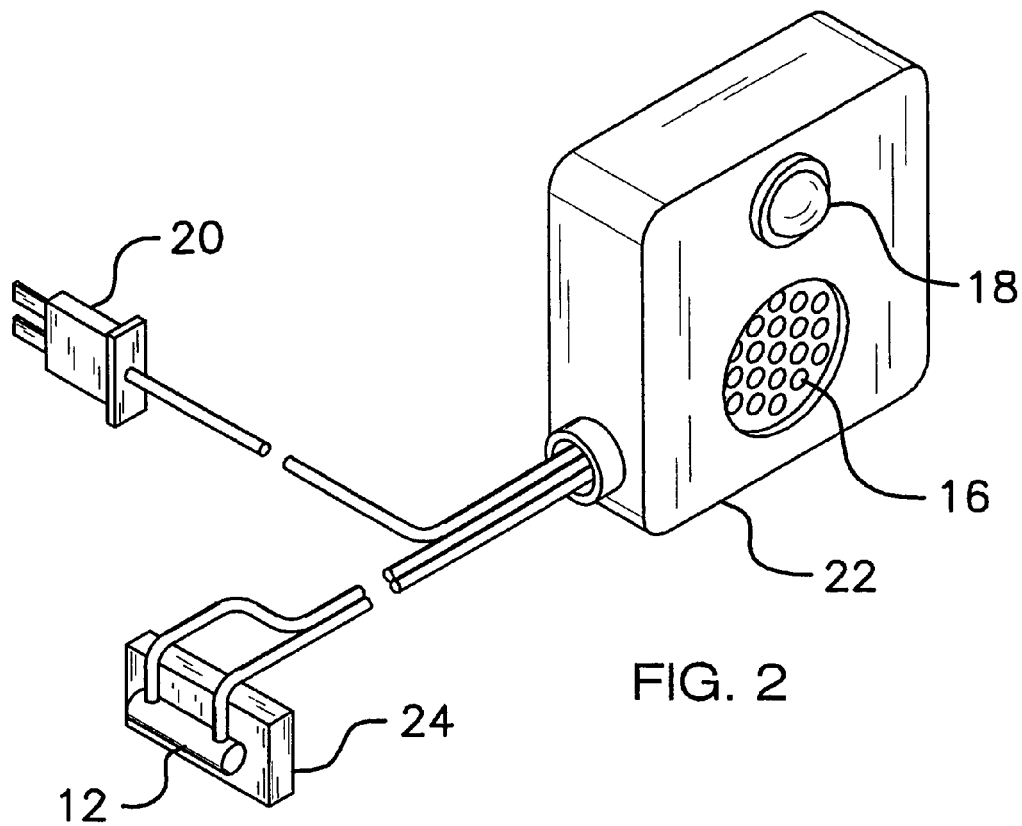
FIG. 2 is a schematic perspective view of the present invention.
Figure 3:
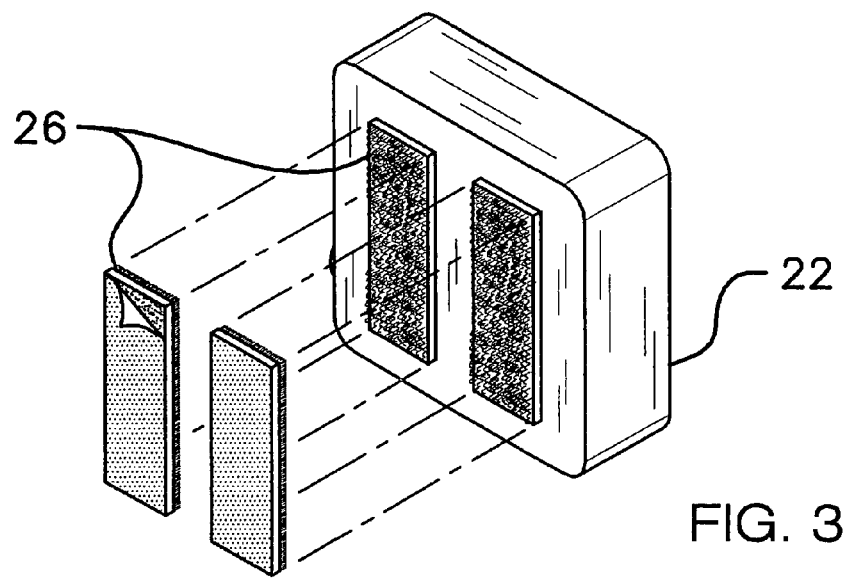
FIG. 3 is a schematic perspective view of the housing of the present invention.
Figure 4:
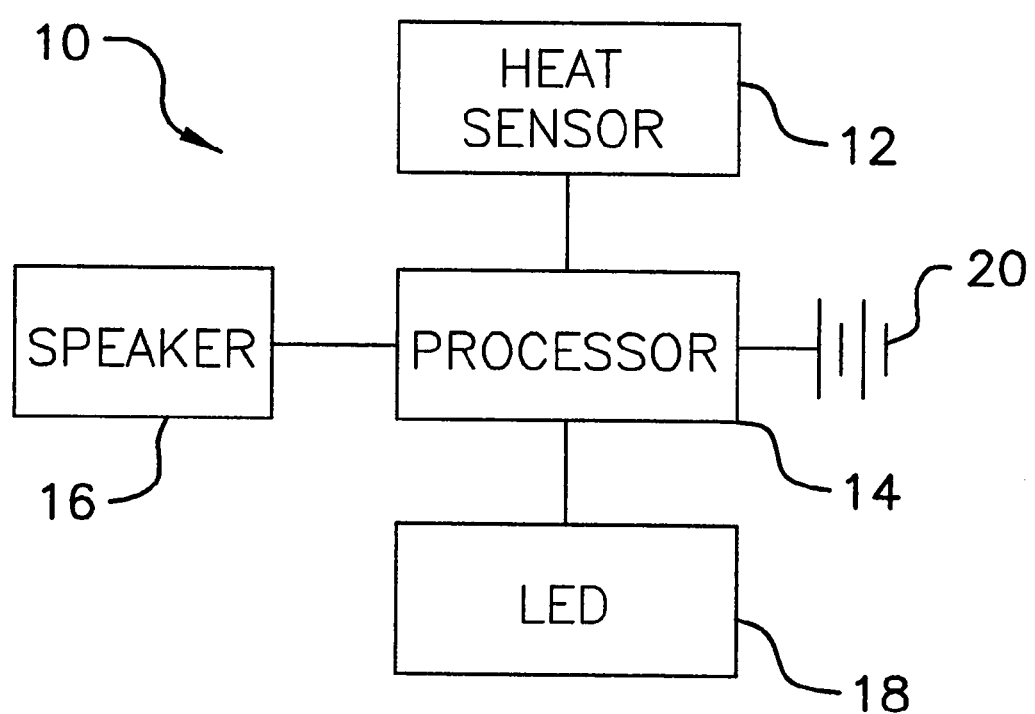
FIG. 4 is an electronic schematic view of the present invention.

With reference now to the drawings, and in particular to FIGS. 1 through 4 thereof, a new engine thermostat device embodying the principles and concepts of the present invention and generally designated by the reference numeral 10 will be described.

As best illustrated in FIGS. 1 through 4, the engine temperature monitoring device 10 generally includes a heat sensor 12 adapted for detecting ambient temperature levels. A processor 14 adapted for monitoring the temperature levels is operationally coupled to the heat sensor 12.

A speaker 16 for producing an audible sound is operationally coupled to the processor 14. The speaker 16 is turned on when the heat sensor 12 detects a temperature of an engine 8 which is greater than an acceptable tolerance.

The accepted tolerance will vary depending with the engine and will be measured by the heat sensor at a position adjacent to the frost plug of an engine. The highest acceptable tolerance is the temperature of the engine adjacent to the heat plug when the coolant of the engine would be 200° F., regardless of whether or not the cooling system of the vehicle is functional. Thus, for each make of engine, the temperature may vary due to materials and type of fuel used. The heat sensor measures the temperature of the engine itself, not the temperature of the coolant. However, most conventional coolant systems attempt to sustain a coolant temperature of less than 200° F. By plotting the coolant temperature against the engine temperature, the user of the device will know what the acceptable operating temperature of the engine is to ensure that the engine does not seize. The processor will pre-programmed with the desired temperature. This temperature can be, and is often several hundred degrees higher than the temperature of the coolant. However, since the user will be measuring the engine temperature directly, if there is a cooling system malfunction or coolant leak, the device will continue to function properly.

A light emitter 18 is operationally coupled to the processor 14. The light emitter 18 emits a pulsating light when the heat sensor 12 detects a temperature of the engine 8 which is greater than the acceptable tolerance. The light is preferably a conventional light emitting diode (LED). The processor 14, the speaker 16 and the light emitter 18 are each mounted in a housing 22. A power supply 20 is operationally coupled to the processor 14.

A securing member 24 is attached to the heat sensor 12 for selectively mounting the heat sensor 12 to the engine 8. The securing member 24 preferably comprises a magnet. A fastening member 26 is attached to the housing 22 for selectively fastening the housing 22 to an interior of the vehicle 9. The fastening member 26 preferably comprises a conventional hook and loop fastener with a loop portion attached to the housing 22 and a loop portion adhesively attached to a dashboard of the vehicle 9.

In use, the heat sensor 12 is secured to the engine 8 such that the heat sensor 12 may detect the temperature of the engine 8. The heat sensor 12 is preferably mounted on, or adjacent to the frost plug of the engine 8. When the temperature of the engine 8 rises above the accepted tolerance, the processor 14 turns on the light emitter 18 and speaker 16 to warn the user of the vehicle 9 that the engine 8 is too hot. This will signal the user to turn off the engine 8. Unlike conventional vehicle thermostats that operate by taking the temperature of the coolant, the present device 10 will continue to work regardless of whether or not the coolant is flowing properly through the cooling system of the vehicle.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A temperature warning indicator assembly for an engine of a vehicle, said assembly comprising:
    a heat sensor adapted for detecting ambient temperature levels;
    a securing member being attached to said heat sensor, said securing member attaching said heat sensor adjacent to an exterior surface of the engine for measuring an ambient temperature adjacent to the engine;
    a processor being adapted for monitoring said temperature levels being operational coupled to said heat sensor;
    a speaker for producing an audible sound being operationally coupled to said processor, said speaker being turned on when said heat sensor detects a temperature of the engine which is greater than an acceptable tolerance;
    a power supply being operationally coupled to said processor; and
    wherein said heat sensor is secured to the engine such that said heat sensor may detect the temperature of the engine.

2. The temperature warning indicator assembly of claim 1, further including a light emitter being operationally coupled to said processor, said light emitter emitting a pulsating light when said heat sensor detects a temperature of the engine which is greater than the acceptable tolerance.

3. The temperature warning indicator assembly of claim 1, further including a housing, said processor, said speaker and said light emitter each being mounted in said housing, a fastening member being attached to said housing for selectively fastening said housing to an interior of the vehicle.

4. The temperature warning indicator assembly of claim 1, wherein said securing member comprises a magnet.

5. A temperature warning indicator assembly for an engine of a vehicle, said assembly comprising:
    a heat sensor adapted for detecting ambient temperature levels;
    a processor being adapted for monitoring said temperature levels being operationally coupled to said heat sensor;
    a speaker for producing an audible sound being operationally coupled to said processor, said speaker being turned on when said heat sensor detects a temperature of the engine which is greater than an acceptable tolerance;
    a light emitter being operationally coupled to said processor, said light emitter emitting a pulsating light when said heat sensor detects a temperature of the engine which is greater than the acceptable tolerance;
    a housing, said processor, said speaker and said light emitter each being mounted in said housing;
    a power supply being operationally coupled to said processor;
    a securing member being attached to said heat sensor for selectively mounting said heat sensor adjacent to an outer surface of the engine, said securing member comprising a magnet;
    a fastening member being attached to said housing for selectively fastening said housing to an interior of the vehicle; and wherein said heat sensor is secured to the engine such that said heat sensor may detect the temperature of the engine.

* * * * *